Oct. 28, 1930. C. L. C. MAGEE ET AL Re. 17,849

FRICTION GRIPPING MECHANISM

Original Filed April 6, 1925

Inventors.
Chauncey L. C. Magee,
Benjamin S. Pfeiffer,
By Wilkinson, Huxley, Byron, and Knight
attys.

Witness:
R. Burkhardt.

Reissued Oct. 28, 1930

Re. 17,849

UNITED STATES PATENT OFFICE

CHAUNCEY L. C. MAGEE AND BENJAMIN S. PFEIFFER, OF CHICAGO, ILLINOIS

FRICTION GRIPPING MECHANISM

Original No. 1,594,180, dated July 27, 1926, Serial No. 20,919, filed April 6, 1925. Application for reissue filed May 9, 1927. Serial No. 190,088.

This invention relates to mechanism for frictionally gripping a rotary element to a second element, which is either stationary, as in the case of a brake, so as to retard or stop the rotary element, or is capable of rotating, as in the case of a clutch, where said second element is caused to rotate with said rotary element.

Generally stated, the object of the invention is to provide a novel and improved construction whereby the torque of the rotating element is utilized to develop the power necessary or some portion thereof to effect a gripping between the elements, and particularly to a construction having a gripping element which carries means for effecting an expansion thereof and means utilizing the torque of said rotary element to actuate said means carried by said gripping element and accordingly, to effect a gripping between the elements.

It is also an object to provide certain details and features of construction and combinations tending to increase the general efficiency and the desirability of a self-operating, so to speak, friction gripping mechanism of this particular character.

To these and other useful ends, the invention consists in the matters hereinafter set forth and claimed, and shown in the accompanying drawings, in which—

Figure 1:
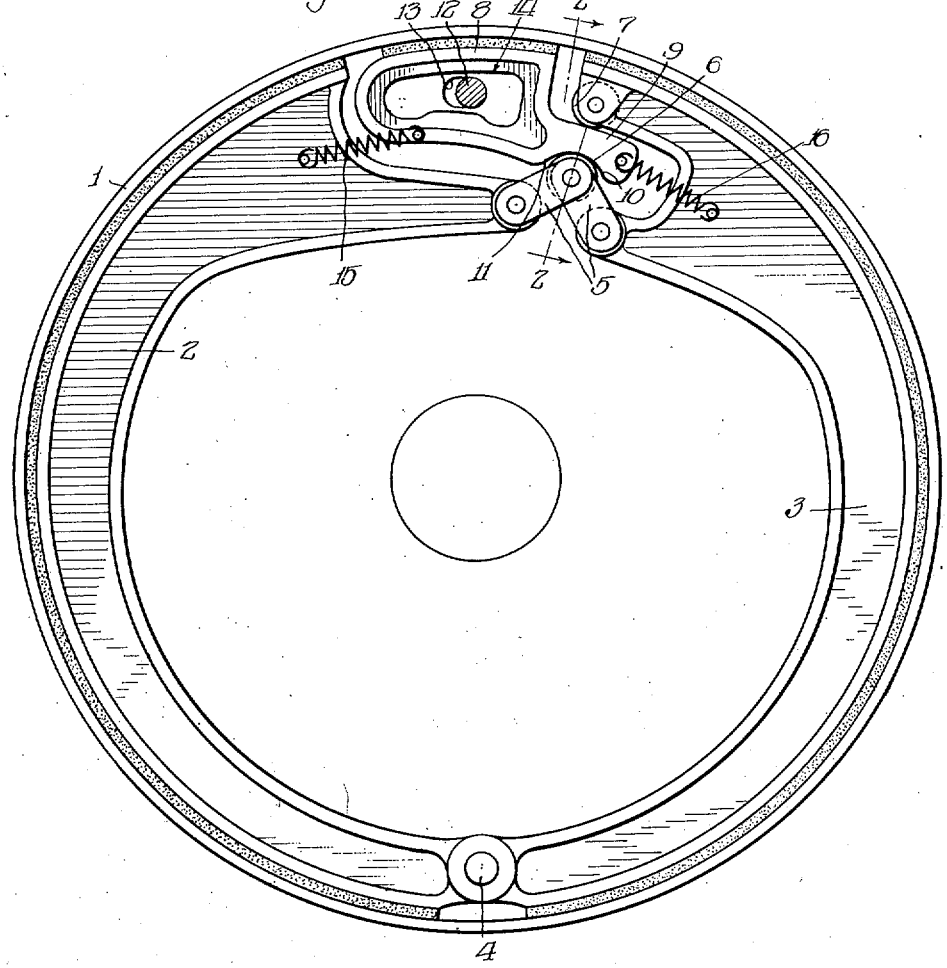
Figure 2:
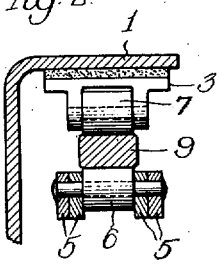

Figure 1 is a side elevation of a friction gripping mechanism embodying the principles of the invention; and Figure 2 is a detail section on line 2—2 in Figure 1.

As thus illustrated, the invention comprises the rotating element 1, or friction drum, such as those on the hubs of motor vehicles or clutch part. The friction gripping mechanism is all inside of this drum, and comprises the two members 2 and 3, which are pivoted together at 4 so that they can swing apart, the outer sides of these members having suitable material for engagement with the inner surface of the flange of the drum (see Figure 2). The two members are connected together by toggle links 5, and the toggle joint has a roller 6, and a similar roller 7 is mounted on the member 3, as shown. A loose or floating friction member 8 is disposed between the upper ends of the members 2 and 3, in the manner shown, and is provided with a tail portion 9 disposed between the rollers 6 and 7 previously mentioned. It will be seen that this tail portion has an inclined or beveled surface at 10, and a similar one at 11, whereby if the member 8 is shifted to the left, the surface 10 will react against the roller 6 and tend to crowd the two rollers apart, thus causing the toggle joint to straighten and crowd the members 2 and 3 apart at their upper ends. On the other hand, if the member 8 is moved to the right, the incline or bevel or cam surface 11 will react against the roller 6 and cause the two rollers to be crowded apart, thus straightening the toggle and setting the brake members 2 and 3 forcibly against the inner surface of the drum.

For the operation of the gripping mechanism, therefore, a horizontal shaft 12 is provided with a cam 13 for engaging the inner edge 14 of the member 8 and for thereby crowding this member upwardly against the drum. When this is done, the member 8 will be inclined to move with the drum in either direction depending upon which way the drum is rotating. Such displacement of the member 8 will cause the tail piece 9 to crowd the two rollers 6 and 7 apart, thus straightening the toggle and causing the members 2 and 3 to exert pressure against the inner surface of the drum. Thus the power necessary to push the member 8 forcibly against the inner surface of the drum may be comparatively slight and the necessary gripping action is then brought about by the utilization of the torque of the rotating element so that the rotation of the element to be gripped is really developed into power to set the gripping mechanism.

Springs 15 and 16 may be applied, as shown, to hold the member 8 yieldingly in normal position. It will also be understood, of course, that the gripping mechanism with its pivot 4 is suitably mounted on any stationary support, in the case of a brake, such as the axle housing of the ordinary motor vehicle, or to a shaft or other element capable of rotating and to be connected for rotation with the drum, and that the shaft 12 may be supported and operated in any suitable or desired manner, as by means of a foot pedal or lever (not shown), so connected that it will be operative to rotate or rock the shaft 12 sufficiently to raise the member 8 and thereby automatically, so to speak, set the gripping mechanism by means of the torque or rotation of the vehicle wheel when applied in a vehicle brake.

It will be seen that the cam 13 when moved downwardly will engage the member 8 and press it downwardly away from the inner surface of the drum, thus releasing the gripping mechanism. Preferably, this is the normal position of the cam, thereby keeping the member 8 from vibrating and from rubbing against the inner surface of the drum.

It will be further seen that we have provided a device which utilizes the torque of a rotary element to actuate the gripping mechanism to effect a braking or clutching action therewith, and also that the expanding element supports the means for effecting the expansion thereof, whereby all of the forces occasioned by the actuation are imparted to the expanding element to effect the gripping operation and thereby eliminates any wasting of these forces as components taken on bearings or supports provided, on which wear would be accordingly produced.

It is to be understood that the essential features of our invention reside in the principle of operation and that the particular structure disclosed in the drawings is merely illustrative in that any type of actuating means may be substituted for the toggle links and roller 7, provided it is carried on the expanding element and is connected to impart all of the forces to the expanding element and utilizes the torque in its operation. Any type of expanding element may be employed, and also any equivalent means may be substituted for the loose or floating friction member 8, provided only that it is capable of utilizing the torque for operating the actuating means and the expanding element.

What we claim as our invention is:

1. In friction brake mechanism, a rotating element, brake shoe means in position to operatively engage said element to stop or retard the rotation thereof, and instrumentalities comprising a friction member for engaging said rotating element to utilize the torque or rotation thereof to operate said brake shoe means, said instrumentalities also comprising a toggle joint, and means having a wedging action between said joint and a portion of the brake shoe and whereby displacement of said friction member by the rotation of said element is operative through said toggle joint to set the brake shoe means against the rotating element.

2. In friction brake mechanism, a rotating element, brake shoe means in position to operatively engage said element to stop or retard the rotation thereof, and instrumentalities comprising a friction member for engaging said rotating element to utilize the torque or rotation thereof to operate said brake shoe means, said brake shoe means comprising two shoes pivoted together at one end and separated at their other ends, and said instrumentalities also comprising a toggle joint connection between the separated ends of the shoes, together with a roller on said toggle joint, a similar roller on one of said brake shoes, said friction member having a portion interposed between said rollers and formed to crowd said rollers apart when said member is moved in either direction by the rotation of said rotating element.

3. The combination of a drum, friction shoes pivoted together and formed to engage the drum, a friction member between the ends of said shoes, a toggle connection between said ends of the shoes, means to operate said toggle to push the shoes into engagement with the drum, operated by said member, and means to cause said member to engage the drum, thereby to operate the toggle.

4. In friction gripping mechanism, a rotating element, friction shoe means in position to operatively engage and grip said element, and instrumentalities comprising a friction member for engaging said rotating element to utilize the torque or rotation thereof to operate said friction shoe means, said instrumentalities also comprising a toggle joint, and means having a wedging action between said joint and a portion of said friction shoe and whereby displacement of said friction member by the rotation of said element is operative through said toggle joint to set the friction shoe means against the rotating element.

5. In friction gripping mechanism, a rotating element, friction shoe means in position to operatively engage and grip said element, and instrumentalities comprising a friction member for engaging said rotating element to utilize the torque or rotation to operate said friction shoe means, said friction shoe means comprising two shoes pivoted together at one end and supported at their other ends, and said instrumentalities also comprising a toggle joint connection between the separated ends of the shoes, together with a roller on said toggle joint, a similar roller on one of said friction shoes, said friction member having a portion introduced between said rollers and formed to crowd said rollers apart when said member is moved in either direction by the rotation of said rotating element.

6. In friction brake mechanism, a rotating element, brake shoe means in position to operatively engage said element to stop or retard rotation thereof, and instrumentalities comprising a friction member carried by said brake shoe means for engaging said rotating element to utilize the torque or rotation thereof to operate said brake shoe means, said friction member being displaceable by the rotation of said rotating element, and said instrumentalities also comprising means rigid with said fricton member having a wedging action between said brake shoe means and operated by said displacement to set the brake mechanism.

7. In friction gripping mechanism, a rotating element, friction shoe means in position to operatively engage and grip said element and instrumentalities comprising a friction member carried by said friction shoe means for engaging said rotating element to utilize the torque or rotation thereof to operate said friction shoe means, said friction member being displaceable by the rotation of said rotating element, and said instrumentalities also comprising means rigid with said fricton member having a wedging action between said friction shoe means and operated by said displacement to set said gripping mechanism.

8. In friction gripping mechanism, a rotating element, and an element to be frictionally engaged therewith comprising a friction gripping means and an actuating means for engaging said rotating element and to be moved therewith relative to said friction gripping means and means connecting said friction gripping means and actuating means for causing by their relative movement, said gripping means to engage said rotary element, said actuating means and connecting means being entirely carried by said friction gripping means whereby said friction gripping means, actuating means and connecting means constitute an assembly completely floating with respect to said rotating element, said actuating means and connecting means being constructed to impart the entire force occasioned by the relative movement to and in a manner to actuate said gripping means.

9. In a friction gripping mechanism, a rotatable element and an element to be frictionally engaged therewith comprising a gripping means, an actuating means adapted to frictionally engage said rotatable element and move therewith relative to said gripping means and means connecting said gripping means and actuating means for actuating said gripping means when said actuating means moves relative thereto, said actuating means and said connecting means being entirely carried by said gripping means whereby to form therewith an assembly completely floating with respect to said rotatable element.

Signed at Chicago, Illinois, this 23rd day of April, 1927.

CHAUNCEY L. C. MAGEE.
BENJAMIN S. PFEIFFER.